3,070,578
PHOSPHORUS-CONTAINING POLYCONDENSATION RESINS AND PROCESS FOR PREPARING THEM

Claus Heuck, Hofheim, Taunus, Fritz Rochlitz and Heinz Schmidt, Frankfurt am Main, and Herbert Vilcsek and Jakob Winter, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 26, 1959, Ser. No. 815,828
Claims priority, application Germany May 31, 1958
9 Claims. (Cl. 260—75)

The present invention relates to novel phosphorus-containing polycondensation resins and to process for preparing them.

It is known to produce polyesters from alcohols and carboxylic acids. When $\alpha,\beta$-unsaturated alcohols or $\alpha,\beta$-unsaturated dicarboxylic acids are used, the polyesters obtained can be hardened either alone or in admixture with polymerizable compounds. Furthermore it has already been proposed to replace the carboxylic acid radicals wholly or partially by radicals of phosphonic acids (cf. copending application Serial No. 698,053, filed on November 22, 1957, by Werner Starck et al.), of phosphoric acid (cf. Italian Patent 586,816), of phosphorous acid (cf. copending application Serial No. 718,943, filed on March 4, 1958, by Werner Starck et al.) or by radicals of aromatic phosphonic acids (cf. copending application Serial No. 748,582 filed July 15, 1958). In view of their phosphorus content the said resins are more or less difficulty inflammable or extinguish automatically after the removal of the flame.

Now we have found that novel phosphorus-containing polycondensation resins having excellent properties can be produced using as phosphorus component the dihalides of phosphoric acid or phosphorous acid monoesters, that is to say compounds having the following constitution:

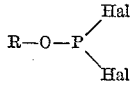

and

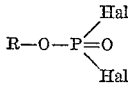

wherein R stands for a monovalent aliphatic hydrocarbon radical having 1–18 carbon atoms in a straight or branched chain, preferably a radical of 1–8 carbon atoms, such as a methyl, ethyl iso-propyl or actyl radical; furthermore a monovalent cycloaliphatic hydrocarbon radical, for example a cyclohexyl or decahydronaphthyl radical; a monovalent aromatic hydrocarbon radical such as the phenyl, tolyl and naphthyl radical. The radicals indicated by way of example may be substituted once or more than once, for example by halogen atoms, preferably chlorine, or by alkoxy groups such as methoxy, ethoxy, butoxy, and analogous groups.

The phosphorus compounds used for the production of the novel resins are readily accessible and can be obtained by reacting phosphorus trihalides or phosphorus oxyhalides with alcohols and phenols.

The novel resins are produced according to the invention by reacting dihalides of phosphoric acid and phosphorous acid monoesters with carboxylic acid polyesters containing hydroxyl groups and/or with polyhydric saturated or unsaturated alcohols, or with mixtures of monohydric and polyhydric, saturated or unsaturated alcohols and saturated or unsaturated aliphatic and/or cycloaliphatic and/or aromatic polybasic carboxylic acid derivatives, or carboxylic acids or mixtures of mono- and polybasic carboxylic acids or carboxylic acid derivatives. The aforesaid carboxylic acid derivatives shall include the esters, anhydrides and halides, preferably chlorides.

The process of the invention can be carried out in a manner such that a polyester containing hydroxyl groups is first prepared by known methods which polyester is then esterified in a second stage with a dihalide of phosphoric acid or phosphorous acid esters.

It is likewise possible to react the appropriate phosphorus halides in a first stage with an excess, that is to say an amount that is equivalent to the amount of carboxylic acid added in the second stage or about 30 mol percent higher, of a polyhydric alcohol or a mixture of mono- and polyhydric alcohols, the molar ratio between monohydric and polyhydric alcohols preferably being not higher than 30:70, and then to react in a second stage the compounds obtained with the corresponding amount of a polybasic carboxylic acid or mixtures of such carboxylic acids or mixtures of mono- and polybasic carboxylic acids or the corresponding derivatives, for example the anhydrides, esters and halides, preferably the chlorides. In case a mixture of mono- and polybasic carboxylic acids or carboxylic acid derivatives is used, the mixture shall contain, in general, not more than 20 mol percent of monobasic carboxylic acids or carboxylic acid derivatives.

It is furthermore possible to react in one stage derivatives of polybasic, saturated and/or unsaturated carboxylic acids or mixtures of derivatives of mono- and polyvalent, saturated or unsaturated carboxylic acids together with the halides of the phosphoric acid or phosphorous acid esters in the presence of a corresponding amount of mono- or polyhydric alcohols or mixtures of mono- and polyhydric alcohols, while the hydrogen halide set free in the reaction may simultaneously act as esterification or re-esterification catalyst. The number of hydroxyl groups shall be equivalent, in general, to the number of acid groups or be present in an excess of up to about 30 mol percent.

In addition to the three possibilities of reaction mentioned above further methods may be used. The carboxylic acid polyester containing hydroxyl groups may be reacted with the corresponding phosphorus halides in the presence of mono- and/or polyhydric alcohols. Moreover the phosphorus halides can be reacted with mono- and/or polyhydric alcohols and polybasic carboxylic acids in the presence of polyesters containing hydroxyl groups and also carboxylic acid polyesters that do not contain free hydroxyl groups, in the latter case re-esterification taking place. In most of these reactions there may be used instead of the carboxylic acids the anhydrides thereof, as far as they exist, or other reactive derivatives such as esters and halides of the carboxylic acids.

In general the phosphorus halides are esterified in a manner such that the halides are slowly introduced into a polyhydric alcohol, or a mixture of several polyhydric alcohols, or a polyester containing hydroxyl groups, or into a mixture of mono- and polyhydric alcohols at a temperature in the range from about 0 to 120° C. and preferably from 30 to 70° C. Depending on the viscosity of the alcohol, the alcohol mixture or the polyester containing hydroxyl groups used, it may be necessary to employ simultaneously a solvent, such as aromatic and/or aliphatic hydrocarbons, for example toluene, xylene, benzine; or cyclic ethers, for example dioxane or tetrahydrofurane; or other inert solvents, for example chlorobenzene. The hydrogen halide set free in the reaction can be removed from the reaction mixture under reduced pressure, by a current of an inert gas, such as nitrogen or carbon dioxide, by suitable hydrogen halide acceptors, such as tertiary bases, for example triethyl amine, dimethyl aniline or others, or by simple heating. The removal of hydrogen halide is furthermore favored by cyclic ethers, such as tetrahydrofurane or dioxane already mentioned above as solvents. In order to eliminate the hydrogen halide, it is likewise possible to apply several of the aforesaid steps. It is particularly easy to remove the hydrogen halide under reduced pressure with simultaneous increase of the temperature, for example under a pressure in the range from 100 to 150 mm. of mercury and at a temperature ranging from 100 to 180° C. Other conditions may likewise be chosen, but it is not advisable, in general, to heat to a temperature above 180° C. since otherwise colorations could occur.

Depending on the selection of the reaction conditions, linear or more or less cross-linked products are obtained. Largely cross-linked products are obtained with the use of at least trihydric alcohols. Such resins possess, according to their degree of cross-linking, a more or less poor solubility which can be improved, however, by the incorporation of mono- and dihydric alcohols.

In the process of the invention there can be used a very great number of dihalides of phosphorus acid and phosphoric acid monoesters, particularly compounds prepared by reacting phosphorus trihalides or phosphorus oxyhalides with aliphatic alcohols having up to about 18 carbon atoms and preferably 3 to 10 carbon atoms, with aliphatic/aromatic alcohols such as benzyl alcohol or phenyl alcohol, with cyclic alcohols such as cyclohexyl alcohol, with heterocyclic alcohols such as furfuryl alcohol or with phenols. The aforesaid alcohols and phenols may, of course, be substituted.

For the manufacture of the aforesaid dihalides of the phosphorous acid and phosphoric acid monoesters, it is of advantage to use phosphorus trichloride and phosphorus oxychloride or also the corresponding bromides.

For the manufacture of the phosphorus-containing polycondensation products by the process of the invention there may be used, on principle, all polybasic carboxylic acids that contain at least one carbon atom between the carboxyl groups. In addition to polybasic carboxylic acids there may likewise be used monocarboxylic acids. There can be used, for example: malonic acid, succinic acid, chlorosuccinic acid, adipic acid, sebacic acid, phthalic acid, isophthalic acid, terephthalic acid, tetrachlorophthalic acid, hexachloroendomethylene-tetrahydrophthalic acid, maleic acid, fumaric acid, itaconic acid, mesaconic acid, citraconic acid, malic acid, tartaric acid, trimesic acid, tricarballylic acid, aconitic acid, citric acid, hemimellitic acid, pyromellitic acid, 4,4'-diphenylolpropane-diacetic acid, resorcinol-diacetic acid etc.

There may furthermore be used as monobasic carboxylic acid saturated aliphatic carboxylic acids having at least 2 carbon atoms, unsaturated aliphatic carboxylic acids, saturated or unsaturated cycloaliphatic carboxylic acids, and aromatic or heterocyclic carboxylic acids or oxyacids, or carboxylic acids substituted by halogen atoms, such as acetic acid, propionic acid, butyric acid, crotonic acid, sorbic acid, benzoic acid, chlorobenzoic acid, furancarboxylic acid, cinnamic acid, methacrylic acid, acrylic acid, nicotinic acid, lactic acid, oxybutyric acid, chloroacetic acid, stearic acid, oleic acid, fatty acid of linseed oil, ricinic acid, or ricinoleic acid.

The number of suitably polyhydric alcohols is, of course, also very large. There may be mentioned by way of example: ethylene glycol, polyethylene glycols, propylene glycol, butylene glycol, hexane-diol, butane-diol, mono- and polycyclic alcohols, such as tricyclo-decanedimethylol or tricyclo-decanetrimethylol, glycerol, hexanetriol, pentaerythritol, dipentaerythritol, sorbitol, 1,2-diphenylethylene glycol, phthalyl alcohol, partial alkyl ethers of the aforesaid tri- or polyhydric alcohols which contain at least two free hydroxyl groups etc.

Particularly suitable are dihydric alcohols containing at most 3 carbon atoms between the hydroxyl groups. In many cases it is of advantage to combine at least trihydric alcohols with monohydric alcohols. In some cases halogen-containing alcohols may likewise be used with success.

As monohydric alcohols there may be mentioned by way of example: methyl alcohol, ethyl alcohol, propyl alcohol, butyl alcohol, propargyl alcohol, etc., benzyl alcohol, ethyl hexanol, allyl alcohol, oleyl alcohol, chloroethanol, tricyclodecanemonomethylol. The amounts of the monohydric alcohols used preponderantly depend on the amount of the at least trihydric alcohols employed.

Thus a great number of alcohols, carboxylic acids and dihalides of phosphorous acid and phosphoric acid monoesters may be used as starting material for the manufacture of the phosphorus-containing polyesters according to the process of the invention and consequently a very large number of various novel types of condensation resins can be produced. The number of the novel resins is further increased by the fact that several different alcohols, carboxylic acids and halides of phosphorous acid and phosphoric acid monoesters may be used simultaneously for the production of one resin whereby resins are obtained which have the most different properties. It has proved particularly advantageous to use for certain applications, for example for the production of baking lacquers, ethylene glycol in addition to glycerol, maleic acid and fatty acid of linseed oil in addition to terephthalic acid.

The incorporation of the phosphorous acid or phosphoric acid monoesters can be varied within wide limits. It is of advantage to choose the molar ratio of the phosphorus compounds to the sum of the carboxylic acids between 1:10 and 10:1.

The phosphorus-containing condensation resins produced by the process of the invention are transparent products of high molecular weight which are slightly colored or colorless. With an appropriate selection of the components and the proportions thereof, products are obtained having the most varying properties which can be adapted to the respective application. When unsaturated carboxylic acids or alcohols are used in the process of the invention, the polycondensation products obtained also contain incorporated halogen since the hydrogen halide set free in the course of the reaction is additively combined with part of the double bonds. A further advantage of the process of the invention consists in the fact that absolutely linear polycondensation products are obtained, when the reaction conditions are chosen so that only the two halogen atoms of the dihalides of the phosphorous acid and phosphoric acid monoesters that are more reactive than the ester group, react with the dihydric alcohols in the presence of dibasic carboxylic acid chlorides, at a temperature in the range from about 0 to 120° C., preferably 30–70° C., while the ester group of the monoesters mentioned is not liable to any re-esterification process. The polycondensation products thus obtained are characterized by a good solubility in many organic solvents.

The products produced by the process of the invention can be used as flameproof additives, for the impregnation of paper and textile materials and the like, as adhesives and coating compounds. When at least trihydric alcohols are used for the manufacture of the condensation product, lacquer resins can be obtained which yield excellent flameproof films after baking.

In case the phosphorus-containing condensation products prepared by the process of the invention contain at least 5 mol percent of $\alpha,\beta$-unsaturated carboxylic acids and/or alcohols of the allyl type, they can be subjected to polymerization under known conditions, whereby they are hardened. The hardened products are then insoluble or only swellable in organic solvents. They are characterized by a high transparency and by the fact that, after having been ignited by an ignition source, they extinguish automatically as soon as that source of ignition has been removed.

Due to the capability of being converted into the insoluble state under suitable conditions, the polymerizable condensation products of the invention can be used for many applications, for example the production of shaped bodies, for the impregnation of paper and textile materials and as lacquers and paints for the protection of surfaces. They may furthermore be admixed with various additives such as highly chlorinated hydrocarbons, filling agents of organic or inorganic nature and reinforced by embedding organic or inorganic fibers such as glass fibers.

The following examples serve to illustrate the invention but they are not intended to limit it thereto, the parts being by weight unless otherwise stated.

*Example 1*

372 parts of ethylene glycol are esterified at 170–190° C. with 666 parts of phthalic anhydride in the presence of xylene as water entrainer until approximately the theoretical amount of water is distilled off. The whole is then cooled to 60° C. and 346 parts of phosphorous acid octyl ester dichloride are added dropwise by means of a dropping funnel. When the addition is complete, the mixture is stirred for another hour at the same temperature. The mixture is then heated for 1 hour to 80° C., for 1 hour to 100° C. and finally for 1 hour to 120° C. Subsequently the pressure is reduced, the whole is heated for 30 minutes to 140° C. and then for 30 minutes to 180° C. under a pressure in the range from 50 to 80 mm. of mercury. A colorless, highly viscous product is obtained which is well soluble in a number of organic solvents.

*Example 2*

175 parts of phosphorous acid butyl ester dichloride are allowed to flow slowly into a solution of 372 parts of ethylene glycol in 300 parts of dioxane at a temperature in the range from 50 to 60° C. The whole is then boiled for 4 hours under reflux, the dioxane is distilled off, 740 parts of phthalic anhydride are added at about 50° C. and esterification is brought about a a temperature in the range from 150 to 180° C. in the presence of xylene as water entrainer. The esterification being complete, the mixture is heated for another hour to 180° C. in vacuo under a pressure of 40–80 mm. of mercury. A phosphorus-containing polyester is obtained having a very high viscosity and a good solubility.

*Example 3*

276 parts of glycerol and 316 parts of phosphoric acid phenyl ester dichloride are reacted at 75° C. The mixture is then heated for another hour at the same temperature, the temperature is then raised to 100° C. and after 30 minutes to 120° C. After 3 hours, the pressure is reduced to 40 mm. of mercury and the whole is heated for a further hour to 120° C. Then there are added 222 parts of phthalic anhydride, 139 parts of fatty acid of linseed oil and 100 parts of xylene and the whole is heated to 150–180° C. whereby esterification takes place which is perceptible by the separation of water. As soon as the esterification is terminated, the xylene is distilled off at 170–180° C. in vacuo under a pressure of 58–80 mm. of mercury.

After cooling, a highly viscous, slightly yellow and limpid resin is obtained which does no longer flow. It is soluble in a great number of organic solvents, such as dioxane, ethylene glycol monoethyl ether, cresol, diacetone-alcohol etc. When dissolved in a suitable solvent, the resin yields a solution from which a hard, firmly adhering, elastic and difficultly inflammable film of a good flow is obtained on glass or metal at a temperature of 200° C. and after a baking time of 10 minutes.

*Example 4*

267 parts of phosphoric acid-p-tert.-butyl-phenyl ester dichloride are added dropwise at 80° C. to a polyester prepared from 184 parts of glycerol and 148 parts of phthalic anhydride. The temperature is then gradually raised to 140°, after 1 hour the pressure is reduced to 40–60 mm. of mercury and the whole is heated for 1 hour to 180° C. The resin obtained is soluble in various solvents. When dissolved in a suitable solvent, the resin yields a hard, elastic and not inflammable film on glass and metal at a temperature of 200° C. and after a baking time of 10 minutes.

*Example 5*

81 parts of phosphoric acid hexyl ester dichloride are reacted at 70° C. with 400 parts of a polyester produced from 148 parts of phthalic anhydride, 162 parts of ethylene glycol and 123 parts of maleic anhydride. The mixture is heated for another hour to 100° C. and then for 1 hour to 120° C. Subsequently the pressure is reduced to a vacuum of 40–60 mm. of mercury, the temperature is raised to 140° C. and finally to 180° C. A viscous, slightly yellowish and transparent resin is obtained which does no longer flow and possesses good dissolving properties in organic solvents. 10 parts of said resin are mixed at 60° C. with 0.3 part of benzoyl peroxide. The mixture can be hardened at 100° C. to yield hard and difficultly inflammable shaped articles.

We claim:

1. A process for making resinous polyesters containing phosphorus incorporated into the molecule by ester linkages, which comprises reacting at a temperature between 30° C. and 70° C. at least one phosphorus compound the group consisting of dihalides of phosphoric acid monoesters and dihalides of phosphorous acid monoesters, the alcohol moiety of said esters being that of an alcohol selected from the group consisting of aliphatic alcohols having 1 to 18 carbon atoms, cycloaliphatic alcohols, and aromatic alcohols, with a mixture of (1) an acid component; and (2) an alcohol component, said acid component consisting of up to 20 mol percent of a monocarboxylic acid, the balance being polycarboxylic acids having at least one carbon atom joined to and between neighboring carboxy groups, and said alcohol component consisting of up to 30 mol percent of a monohydric alcohol, the balance being polyhydric alcohols, the ratio of the total number of hydroxy groups to carboxy groups present in said mixture being between about 1 to 1 and about 1.3 to 1 and the molar ratio of said phosphorus compound to said acid component being between 1 to 10 and 10 to 1.

2. A process as in claim 1 wherein said acid component and alcohol component are first condensed to form a polycarboxylate polyester having free hydroxy groups before reaction with said dihalide.

3. A process as in claim 1 wherein said dihalide and alcohol component are first reacted to form an intermediate which is then reacted with said acid component.

4. A process as in claim 1 wherein said acid component comprises a polycarboxylic acid present as its anhydride.

5. A process as in claim 2 wherein said acid component comprises a polycarboxylic acid present as its anhydride.

6. A process as in claim 3 wherein said acid component comprises a polycarboxylic acid present at its anhydride.

7. Products produced according to the process of claim 1.

8. Products produced according to the process of claim 2.

9. Products produced according to the process of claim 3.

References Cited in the file of this patent

UNITED STATES PATENTS

| | | |
|---|---|---|
| 2,636,876 | Zenftman et al. | Aug. 28, 1953 |
| 2,716,101 | Coover et al. | Aug. 23, 1955 |
| 2,819,247 | Lundberg | Jan. 7, 1958 |